United States Patent
Imai

(10) Patent No.: US 12,513,233 B2
(45) Date of Patent: Dec. 30, 2025

(54) GLASSES-TYPE INFORMATION DEVICE, METHOD, AND STORAGE MEDIUM

(71) Applicant: CANON KABUSHIKI KAISHA, Tokyo (JP)

(72) Inventor: Yasuhiro Imai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 18/459,956

(22) Filed: Sep. 1, 2023

(65) Prior Publication Data

US 2023/0412717 A1   Dec. 21, 2023

Related U.S. Application Data

(63) Continuation of application No. PCT/JP2022/007169, filed on Feb. 22, 2022.

(30) Foreign Application Priority Data

Mar. 5, 2021  (JP) ................................ 2021-035792

(51) Int. Cl.
    *H04M 1/60*  (2006.01)
    *H04R 1/10*  (2006.01)
    *H04R 3/12*  (2006.01)

(52) U.S. Cl.
    CPC ........ *H04M 1/6066* (2013.01); *H04R 1/1008* (2013.01); *H04R 3/12* (2013.01)

(58) Field of Classification Search
    CPC ......... H04M 1/6066; H04M 1/724097; H04M 1/72436; H04M 1/72451; H04M 1/05; H04R 1/1008; H04R 3/12; H04R 2460/13; G02C 11/04
    See application file for complete search history.

(56) References Cited

U.S. PATENT DOCUMENTS

2015/0145670 A1   5/2015   Tsuruoka

FOREIGN PATENT DOCUMENTS

| CN | 1510910    | A  |   | 7/2004  |           |
|----|------------|----|---|---------|-----------|
| CN | 212752603  | U  | * | 3/2021  |           |
| JP | 2004-180162| A  |   | 6/2004  |           |
| JP | 2005175972 | A  |   | 6/2005  |           |
| JP | 2012-23772 | A  |   | 2/2012  |           |
| JP | 2013-114124| A  |   | 6/2013  |           |
| JP | 2016-536684| A  |   | 11/2016 |           |
| JP | 2017079385 | A  |   | 4/2017  |           |
| KR | 102048787  | B1 | * | 11/2019 | H04R 5/0335 |

* cited by examiner

*Primary Examiner* — Matthew D. Anderson
(74) *Attorney, Agent, or Firm* — Canon U.S.A., Inc., IP Division

(57) ABSTRACT

A glasses-type information device includes a first speaker function configured to transmit sound to a user wearing the glasses-type information device, a second speaker function configured to transmit sound to a surrounding area of the glasses-type information device, and a notification function including at least any of a vibration function and a function of turning on a lamp. When temples of the glasses-type information device are folded and the glasses-type information device is not worn by the user, the first speaker function is disabled and output processing is performed using at least any of the second speaker function and the notification function for an application installed on the glasses-type information device.

9 Claims, 17 Drawing Sheets

INDIVIDUAL MODE COMMON CALL SETTINGS

| MODE ID | MODE NAME | EARPHONES/ BONE CONDUCTION | SPEAKER | VIBRATION | LED LAMP | MESSAGE DISPLAY |
|---|---|---|---|---|---|---|
| CALL-MODE-001 | NORMAL MODE | ON | OFF | OFF | OFF | OFF |
| CALL-MODE-002 | MANNER MODE | ON | OFF | OFF | OFF | OFF |
| CALL-MODE-003 | SILENT MODE | ON | OFF | OFF | OFF | OFF |
| CALL-MODE-004 | DRIVE MODE | OFF | ON | OFF | OFF | OFF |
| CALL-MODE-005 | UNWORN MODE | OFF | ON | OFF | OFF | OFF |
| CALL-MODE-006 | CUSTOM MODE | ON | OFF | OFF | OFF | OFF |

FIG.5A

| SETTINGS | |
|---|---|
| Wi-Fi | |
| Bluetooth | |
| MODE SELECTION | NORMAL MODE |
| NOTIFICATION/CALL | |
| SCREEN | |
| BATTERY | |
| ... | |

SETTINGS > MODE SELECTION — 510

MODE: [NORMAL MODE ▽] — 511

☑ ENABLE HARDWARE SWITCHES — 512

| PRIORITY | HARDWARE SWITCH | MODE | |
|---|---|---|---|
| 2 | SWITCH 1 ON | MANNER MODE | ▽ |
| ☐ | SWITCH 2 ON | NONE | ▽ |
| 1 | TEMPLES CLOSED | UNWORN MODE | ▽ |

513

FIG.11
INDIVIDUAL MODE COMMON CALL SETTINGS

| MODE ID | MODE NAME | EARPHONES/BONE CONDUCTION | SPEAKER | VIBRATION | LED LAMP | MESSAGE DISPLAY |
|---|---|---|---|---|---|---|
| CALL-MODE-001 | NORMAL MODE | ON | OFF | OFF | OFF | OFF |
| CALL-MODE-002 | MANNER MODE | ON | OFF | OFF | OFF | OFF |
| CALL-MODE-003 | SILENT MODE | ON | OFF | OFF | OFF | OFF |
| CALL-MODE-004 | DRIVE MODE | OFF | ON | OFF | OFF | OFF |
| CALL-MODE-005 | UNWORN MODE | OFF | ON | OFF | OFF | OFF |
| CALL-MODE-006 | CUSTOM MODE | ON | OFF | OFF | OFF | OFF |

FIG. 12A

INDIVIDUAL MODE COMMON NOTIFICATION SETTINGS

| MODE ID | MODE NAME | EARPHONES/ BONE CONDUCTION | SPEAKER | VIBRATION | LED LAMP | MESSAGE DISPLAY |
|---|---|---|---|---|---|---|
| NOTIFY-MODE-001 | NORMAL MODE | ON | OFF | OFF | OFF | ON |
| NOTIFY-MODE-002 | MANNER MODE | ON | OFF | ON | ON | ON |
| NOTIFY-MODE-003 | SILENT MODE | OFF | OFF | OFF | OFF | ON |
| NOTIFY-MODE-004 | DRIVE MODE | OFF | ON | OFF | OFF | OFF |
| NOTIFY-MODE-005 | UNWORN MODE | OFF | ON | ON | ON | OFF |
| NOTIFY-MODE-006 | CUSTOM MODE | ON | OFF | OFF | OFF | ON |

FIG.12B

NORMAL-MODE INDIVIDUAL APPLICATION NOTIFICATION SETTINGS

| MODE ID | APPLICATION ID | APPLICATION NAME | EARPHONES/ BONE CONDUCTION | SPEAKER | VIBRATION | LED LAMP | MESSAGE DISPLAY |
|---|---|---|---|---|---|---|---|
| NOTIFY-MODE-001 | NOTIFY-APP-001 | TELEPHONE INCOMING | ON | OFF | OFF | OFF | ON |
| NOTIFY-MODE-001 | NOTIFY-APP-002 | LATEST E-MAILS | ON | OFF | OFF | OFF | ON |
| NOTIFY-MODE-001 | NOTIFY-APP-003 | E-MAIL TRANSMISSION | ON | OFF | OFF | OFF | OFF |
| NOTIFY-MODE-001 | NOTIFY-APP-004 | MESSENGER INCOMING | ON | OFF | OFF | OFF | ON |
| NOTIFY-MODE-001 | NOTIFY-APP-005 | LATEST MESSENGER | ON | OFF | OFF | OFF | ON |
| NOTIFY-MODE-001 | NOTIFY-APP-006 | MESSENGER TRANSMISSION | ON | OFF | OFF | OFF | OFF |
| NOTIFY-MODE-001 | NOTIFY-APP-007 | CLOCK ALARM | OFF | OFF | OFF | OFF | OFF |
| NOTIFY-MODE-001 | NOTIFY-APP-008 | CLOCK TIMER | OFF | OFF | OFF | OFF | OFF |
| NOTIFY-MODE-001 | NOTIFY-APP-009 | CALENDAR REMINDER | | OFF | OFF | OFF | ON |
| NOTIFY-MODE-001 | NOTIFY-APP-010 | LATEST NEWS APPLICATION | | OFF | OFF | OFF | ON |
| ... | ... | ... | ... | ... | ... | ... | ... |

FIG.12C

UNWORN-MODE INDIVIDUAL APPLICATION NOTIFICATION SETTINGS

| MODE ID | APPLICATION ID | APPLICATION NAME | EARPHONES/ BONE CONDUCTION | SPEAKER | VIBRATION | LED LAMP | MESSAGE DISPLAY |
|---|---|---|---|---|---|---|---|
| NOTIFY-MODE-005 | NOTIFY-APP-001 | TELEPHONE INCOMING | OFF | OFF | ON | ON | OFF |
| NOTIFY-MODE-005 | NOTIFY-APP-002 | LATEST E-MAILS | OFF | ON | ON | ON | OFF |
| NOTIFY-MODE-005 | NOTIFY-APP-003 | E-MAIL TRANSMISSION | OFF | OFF | OFF | OFF | OFF |
| NOTIFY-MODE-005 | NOTIFY-APP-004 | MESSENGER INCOMING | OFF | OFF | ON | ON | OFF |
| NOTIFY-MODE-005 | NOTIFY-APP-005 | LATEST MESSENGER | OFF | ON | ON | ON | OFF |
| NOTIFY-MODE-005 | NOTIFY-APP-006 | MESSENGER TRANSMISSION | OFF | OFF | OFF | OFF | OFF |
| NOTIFY-MODE-005 | NOTIFY-APP-007 | CLOCK ALARM | OFF | ON | ON | ON | OFF |
| NOTIFY-MODE-005 | NOTIFY-APP-008 | CLOCK TIMER | OFF | ON | ON | ON | OFF |
| NOTIFY-MODE-005 | NOTIFY-APP-009 | CALENDAR REMINDER | OFF | ON | ON | ON | OFF |
| NOTIFY-MODE-005 | NOTIFY-APP-010 | LATEST NEWS APPLICATION | OFF | ON | ON | ON | OFF |
| ... | ... | ... | ... | ... | ... | ... | ... |

GLASSES-TYPE INFORMATION DEVICE, METHOD, AND STORAGE MEDIUM

CROSS-REFERENCE TO RELATED APPLICATIONS

This application is a Continuation of International Patent Application No. PCT/JP2022/007169, filed Feb. 22, 2022, which claims the benefit of Japanese Patent Application No. 2021-035792, filed Mar. 5, 2021, both of which are hereby incorporated by reference herein in their entirety.

BACKGROUND OF THE INVENTION

Field of the Invention

The present invention relates to a mechanism for controlling a notification from an application installed on a glasses-type information device, such as smart glasses.

Background Art

Mobile phones and smartphones have been in widespread use in the consumer market, and means, such as earphones (function for listening to sound while holding the earphones to a user's ears), a speaker, a bone conduction speaker, a vibration, and a light-emitting diode (LED) lamp have been mounted. Smartphones use these means during an incoming call, an alarm operation, a timer operation, or an e-mail notification. In particular, a technique for switching functions as described below has been proposed (PLT 1). That is, during a voice call on a folding-type mobile phone, sound is output from a speaker when the mobile phone is in an open state, and sound is transmitted through a bone conduction speaker when the mobile phone is in a closed state.

In recent years, a technique for smart glasses as a wearable terminal that is used by being worn like glasses has been proposed as a technique for operating in cooperation with a smartphone or substituting a smartphone. It is assumed that this technique will be in widespread use in the consumer market in the future. Some smart glasses have already been commercially available. Like smartphones, some types of smart glasses are provided with means, such as earphones, a speaker, a bone conduction speaker, a vibration, and an LED lamp.

CITATION LIST

Patent Literature

PTL1: Japanese Patent Application Laid-Open No. 2005-175972

A glasses-type information device, such as smart glasses, is worn on the face of a user. Accordingly, a usage situation, a user operation, and a use scene that are specific to smart glasses and different from those of smartphones can be assumed.

For example, there is a case where the speaker sound of a smartphone is turned off to avoid bothering other persons. In this case, the user is not always viewing the screen of the smartphone, and thus a vibration function of the smartphone can be turned on to enable the user to notice a message. In contrast, when the user is wearing the smart glasses, the following situation can be assumed. That is, there is a situation where the vibration function for vibrating the smart glasses is not required, or makes the user uncomfortable even when the speaker sound is turned off to avoid bothering other persons.

It may therefore be desirable to perform notification control assuming at least one of the usage situation, the user operation, and the use scene of the glasses-type information device.

SUMMARY OF THE INVENTION

The present invention is a glasses-type information device that can be worn by a user. The glasses-type information device includes a first speaker function configured to transmit sound to the user wearing the glasses-type information device, a second speaker function configured to transmit sound to a surrounding area of the glasses-type information device, a notification function including at least one of a vibration function and a function of turning on a lamp, and a control means for disabling the first speaker function and performing output processing using at least one of the second speaker function and the notification function for an application installed on the glasses-type information device in a case where temples of the glasses-type information device are folded and the glasses-type information device is not worn by the user, and disabling the second speaker function and the notification function and performing output processing using the first speaker function for the application in a case where the glasses-type information device is worn by the user.

Further features of the present invention will become apparent from the following description of exemplary embodiments with reference to the attached drawings.

BRIEF DESCRIPTION OF THE DRAWINGS

FIG. 5A illustrates an example of display control for a setting screen on the glasses-type information device according to the present invention.

FIG. 5B illustrates an example of display control for a setting screen on the glasses-type information device according to the present invention.

FIG. 11 illustrates an example of an individual mode common call settings table.

FIG. 12A illustrates an example of a notification setting table for each mode.

FIG. 12B illustrates an example of a notification setting table for each mode.

FIG. 12C illustrates an example of a notification setting table for each mode.

DESCRIPTION OF THE EMBODIMENTS

Modes for carrying out the present invention will be described below with reference to the drawings.

First Exemplary Embodiment

Figure 1:
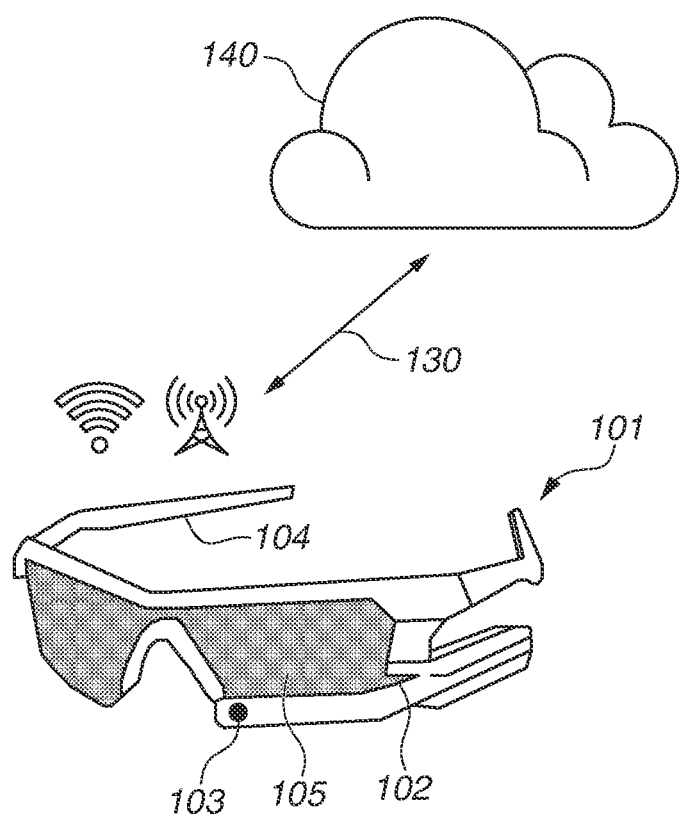
FIG. 1 illustrates an example of a system configuration diagram of a glasses-type information device.

FIG. 1 illustrates an example of a system configuration diagram of a glasses-type information device. The glasses-type information device is a device capable of communicating with a mobile network (mobile communication network) 130 and the Internet 140 directly or via a mobile router (not illustrated). In the present invention, smart glasses 101 are described as an example of the glasses-type information device. As the glasses-type information device, a smart glass for a single eye, a head-mounted display, and the like can also be applied.

The smart glasses 101 are a wearable information terminal that is worn by a user in the vicinity of the user's eyes. The smart glasses 101 display a video image as a virtual image within the field of view on a display unit 102 without obstructing the field of view of the user. Such display method is referred to as so-called augmented reality (AR) or mixed reality (MR), and is provided by a function of projecting information onto a transmission-type display (lens 105), a user's retina (not illustrated), or the like. The smart glasses illustrated in the figure provide a video image to one eye of the user. However, in the present invention, the smart glasses 101 that project a video image to the field of view of both eyes of the user can also be applied.

The display unit 102 is also provided with a camera unit 103 that captures an image of an object in a line-of-sight direction of the user. A frame 104 is an operation frame portion that includes a touch sensor on the outside of the frame and is used to operate the terminal. The frame 104 incorporates an audio function and is configured to transmit sound to the user using a large speaker sound that can be heard by the user without holding the frame to the user's ears, or an earphone sound that can be heard by the user when the frame is in contact with the ears of the user. As a substitute for the earphone sound, a bone conduction function can also be mounted. According to the present exemplary embodiment, in the earphone function, the bone conduction function, and the like, a speaker function for transmitting sound with directivity to the wearer of the smart glasses 101 is defined as a first speaker. In contrast, a speaker (e.g., a speaker 224 to be described below) that outputs sound to surrounding unspecified users, for example, when the smart glasses 101 are in a closed state, is defined as a second speaker.

Further, temple portions of the frame 104 can be closed or opened by folding. A temple opening/closing switch for detecting the open/closed state of the temple portions is mounted on the frame. In addition, an ON/OFF switch used to switch modes, such as a manner mode, and to detect the mode switching can also be mounted on the frame 104. A skin sensor for detecting whether the skin of the user is in contact may be provided on the inside of the frame 104, or a human presence sensor for detecting the presence of a human may also be provided in the vicinity of the camera unit 103 on the frame 104. A notification function, such as a vibration function or an LED lamp blinking function, is also mounted on the frame 104 to transmit to the user a notification from an application installed on the smart glasses 101.

Figure 2:
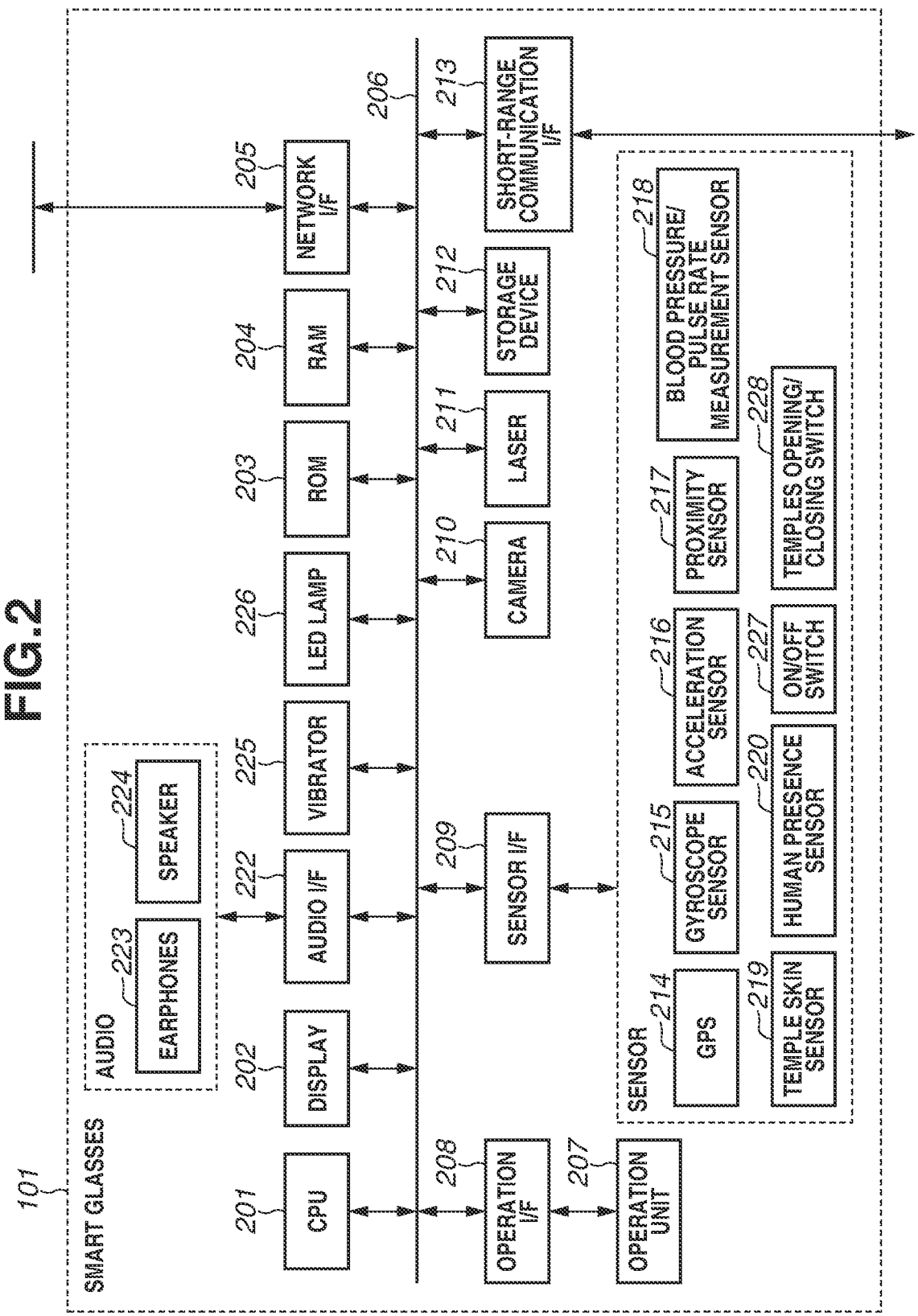
FIG. 2 is a block diagram illustrating a hardware configuration example of the glasses-type information device according to the present invention.

FIG. 2 is a block diagram illustrating a hardware configuration example of the smart glasses 101.

A central processing unit (CPU) 201 uses a program stored in a read-only memory (ROM) 203 to control various functions of the smart glasses 101 in an integrated manner via an internal bus 206. A program execution result from the CPU 201 can be projected and displayed on a display 202 as a video image in the field of view of the user. The present exemplary embodiment assumes a method in which the user views an image projected in the field of view on the display 202 through the transmission type lens 105. However, for example, a method in which the display 202 directly projects an image onto the user's retina can also be employed. The ROM 203 is a flash memory or the like and stores, for example, various setting information and application programs as described above. A random access memory (RAM) 204 functions as a memory or a work area for the CPU 201. The processing illustrated in flowcharts as characteristic processing of the present exemplary embodiment to be described below with reference to the drawings is processing to be implemented by the CPU 201 executing the corresponding program.

A network interface (I/F) 205 is a hardware module for connecting to the mobile network 130 or Wi-Fi®. In a case of using a mobile router, a connection can be established using a universal serial bus (USB) I/F (not illustrated) of the smart glasses 101.

An operation unit 207 receives an input from the user through the frame 104, and transmits a signal corresponding to the input to each processing unit described above via an operation I/F 208. A sensor I/F 209 receives signals from sensors 214 to 220 and signals obtained by switching switches 227 and 228, and transmits the received signals to each of the processing units described above. The sensors 214 to 220 correspond to a global positioning system (GPS), a gyroscope sensor, an acceleration sensor, a proximity sensor, a blood pressure/pulse rate measurement sensor, a skin sensor, and a human presence sensor, respectively. At least any one of these sensors is mounted. The sensors 227 and 228 correspond to an ON/OFF switch and a temple opening/closing switch, respectively. A plurality of ON/OFF switches may be mounted. On the smart glasses 101, a sensor for detecting biological information to implement fingerprint authentication, vein authentication, iris authentication, or the like may also be mounted. A camera 210 has an image capturing function, and captured image data is stored in the ROM 203. A laser 211 projects various contents on the display 202. In a retina projection method, the laser 211 directly projects contents onto the user's retina. A storage device 212 functions as a storage medium and stores various data, such as applications. The storage device 212 also includes a device for reading out data stored in a storage medium, and a device for deleting data. Depending on the terminal to be used, the storage device 212 may be omitted and only the ROM 203 may be used. A short-range communication I/F 213 is an interface used for communication with another wearable terminal or the like.

An audio I/F 222 transmits an audio output to each of earphones 223 and the speaker 224 serving as audio functions. The earphones 223 and the speaker 224 share one audio output port, and the earphones 223 or the speaker 224 outputs sound depending on the content of a notification or intended use. During a voice call, the user receives sound via the earphones 223 or the speaker 224, and transmits sound with a microphone (not illustrated). In this case, a line to be used for a voice call is a network to be connected via the network I/F, or a wired or wireless telephone line to be connected by a telephone line connection component (not illustrated). The audio I/F 222 can also transmit an audio output by bone conduction (not illustrated) instead of using the earphones 223. A vibrator 225 transmits a notification from an application installed on the smart glasses 101 to the user by vibration, and an LED lamp 226 transmits a notification from the application to the user by blinking the LED lamp.

Figure 3:
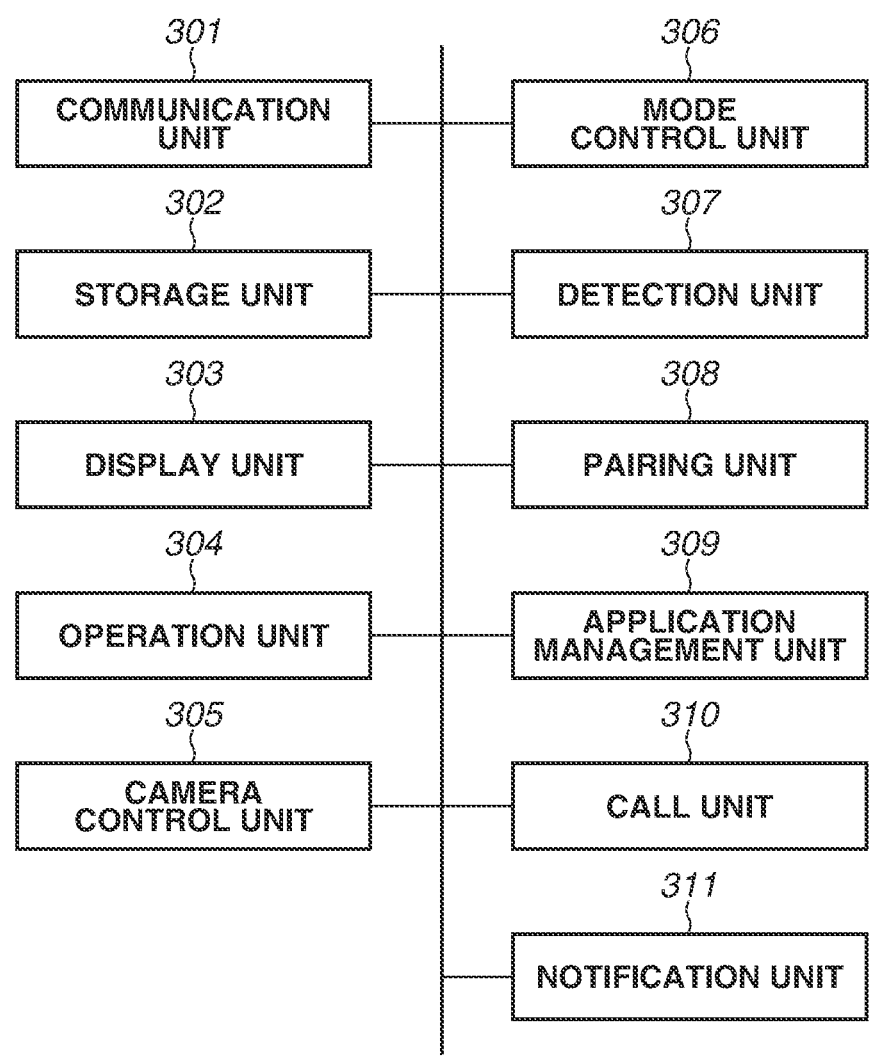
FIG. 3 is a block diagram illustrating a software module configuration example of the glasses-type information device according to the present invention.

FIG. 3 is a block diagram illustrating a software module configuration example of the smart glasses 101.

A communication unit 301 receives a notification from an application server operating in cooperation via the network using the network I/F 205. The communication unit 301 also transmits and receives information to and from the cooperating wearable terminal. A storage unit 302 exchanges information with the ROM 203, the RAM 204, and other processing units, and also stores image data and the like captured by the camera 210.

A display unit 303 displays results of various applications executed by the CPU 201 on an AR/MR display or the like. For example, the display unit 303 displays a content (information projection) on the display 202 using an AR technique such that a virtual content is superimposed on the real space. In the present invention, a method in which an image is directly projected onto the user's retina can also be employed. In the information projection, the user's location and posture in the real space may be estimated based on a technique, such as simultaneous localization mapping (SLAM). The estimation result is used for virtual content display processing.

An operation unit 304 receives an input from the user through the frame 104, receives instructions for operations of various applications and operations for displaying on the display 202, and controls the operations. A camera control unit 305 controls activation, inhibition, and image capturing of the camera 210, and stores captured image data in the ROM 203 in cooperation with the storage unit 302. A mode control unit 306 controls switching of a plurality of call/notification modes included in the smart glasses 101, and switches the smart glasses 101 to a mode desired by the user. The call/notification modes include a normal mode, the manner mode, a silent mode, a drive mode, and a custom mode, and also include an unworn mode that is a characteristic mode of the present exemplary embodiment.

The manner mode is a mode to be transitioned mainly when the user is wearing the smart glasses 101, and functions such as the vibration function and LED are used while the sound output from the speaker is limited. The silent mode is a mode to be transitioned mainly when the user is wearing the smart glasses 101, and the output of sound or vibration, except for the display control for the display 202, is limited. The drive mode is a mode to be transitioned mainly when the user wearing the smart glasses 101 drives a car or the like. The custom mode is a special mode customized by the user of the smart glasses 101. The normal mode is a mode other than the above-described modes, and is a mode to be used when the user is wearing the smart glasses 101. In the normal mode, the sound output from the earphones (or by bone conduction) and the display control for the display 202 are used. The sound output from the speaker can be optionally enabled.

The unworn mode is a mode to be used when the user is not wearing the smart glasses 101. A detection unit 307 manages information about a status change, a usage situation, or the like detected by the sensor I/F 209, and holds the information in the ROM 203. A pairing unit 308 controls the short-range communication I/F 213 to enable bidirectional data communication with an external network device via wireless communication.

An application management unit 309 manages execution statuses of various applications, version information, a notification to each application received from a server, which one of the above-described modes is set, and the like, in the ROM 203 and the RAM 204 via the storage unit 302.

Further, the application management unit 309 controls various applications based on a user input via the operation unit 304. In a case of displaying a content on the display 202 during application control processing, the application management unit 309 displays the content on the display 202 via the display unit 303.

Figure 4:
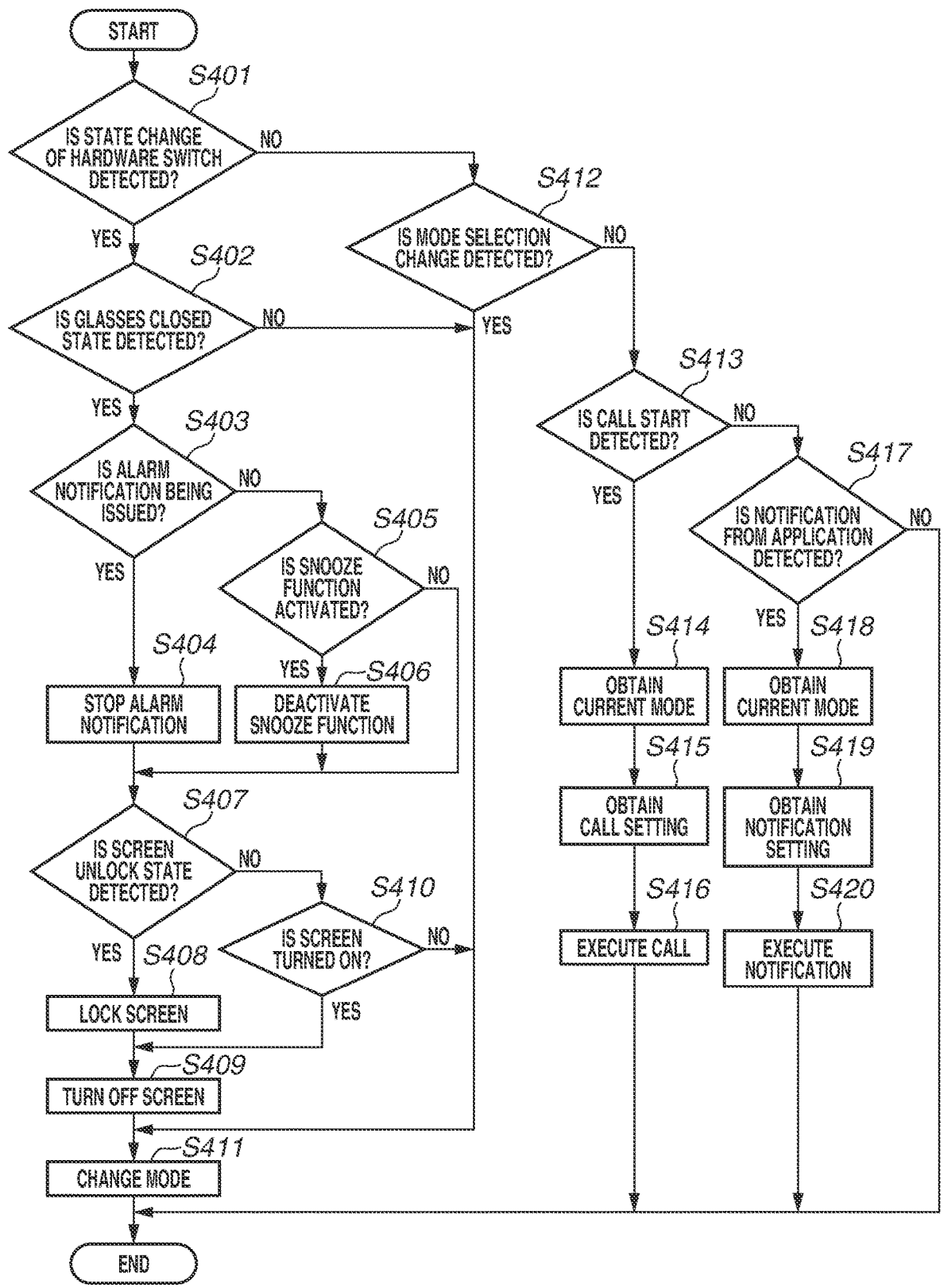
FIG. 4 is a flowchart illustrating notification processing for the glasses-type information device according to a first exemplary embodiment.

FIG. 4 illustrates a processing flow, which is characteristic processing of the present exemplary embodiment, when an application installed on the smart glasses 101 is controlled. Each processing step included in this flowchart is mainly executed by the application management unit 309.

If the detection unit 307 detects, in step S401, a change in the state of the switch or sensor associated with a mode change, the application management unit 309 checks, in step S402, whether the detected change indicates that the temples of the smart glasses 101 are closed. In the present exemplary embodiment, a state where the temples are completely folded and closed may be detected as the state where the temples of the smart glasses are closed ("glasses closed" state). Alternatively, a state where the user is not wearing the smart glasses 101 and the temples are bent at a predetermined angle or more may be detected as the temples-closed state ("glasses closed" state).

If the state where the temples of the smart glasses are closed ("glasses closed" state) is detected, the processing proceeds to step S403. If the detected change indicates a state change of another switch or sensor, the processing proceeds to step S411. In step S411, the mode change is executed based on the detected state of the switch or sensor. In this case, information about the state change from the detection unit 307 is transmitted to the application management unit 309. The application management unit 309 determines the mode based on settings on a setting application for mode selection on the smart glasses 101 and the transmitted information about the state change of the switch or sensor, and changes the mode via the mode control unit 306.

In step S403, it is determined whether an alarm notification is being performed from an application installed on the smart glasses 101. If, in step S404, the notification is being performed, the alarm notification is stopped. If the alarm notification is not being issued, it is further checked, in step S405, whether a snooze function is set. If the snooze function is set, the snooze function is stopped in step S406.

Thereafter, in step S407, it is checked whether the screen is in an unlocked state. If the screen is in the unlocked state, the screen is locked in step S408, and then, in step S409, the screen is turned off. If, in step S407, the screen is in a locked state, it is checked, in step S410, whether the screen is turned on. If the screen is turned on, the processing proceeds to step S409 to turn off the screen. After a series of processes associated with the detection of the temples-closed state described above, including the alarm stopping process, the snooze function stopping process, the screen locking process, and the screen turning-off process, is executed, the mode change is executed based on the temples-closed state in step S411.

In step S401, if the state change of the switch or sensor associated with the mode change is not detected, the processing proceeds to step S412 to check whether a change in mode selection is detected. The detection of a change in mode selection indicates that the user has selected a mode via the operation unit 304 on the setting application regarding settings for the smart glasses 101. When the user selects a mode on the operation unit 304, the selection operation on the application is transmitted to the application management unit 309, and the selected mode information is further transmitted from the application management unit 309 to the mode control unit 306, thereby switching the mode.

If a change in mode selection is not detected in step S412, the processing proceeds to step S413 to check whether a call start is detected. If a call start is detected, the current mode is obtained in step S414, and call settings based on the obtained mode are obtained in step S415. Then, in step S416, a call is executed based on the obtained call settings. In this case, the call start in step S413 described above indicates that, for example, the user presses a call start button on an incoming call application during an incoming call. Further, in the execution of the call in step S416, the smart glasses 101 actually start the call inside the smart glasses in response to the pressing of the call start button. The information to be referenced to obtain the settings in step S415 is information about an individual mode common call settings table illustrated in FIG. 11.

The smart glasses 101 notify the user of information from each application by using the display 202, the earphones 223, the speaker 224, the vibrator 225, or the LED lamp 226 described above with reference to FIG. 2 by means of sound or vibration, blinking or turning on the LED, or displaying message.

On the individual mode common call settings table illustrated in FIG. 11, means for transmitting sound to the user using the above-described notification means during a call is set for each mode as default settings. In the example illustrated in FIG. 11, for example, if the normal mode in which the user is wearing the smart glasses is obtained as the current mode in step S414, the sound output via the earphones (or by bone conduction) is enabled and the sound output via the speaker is disabled, thereby executing the call in the small glasses 101 in step S416. In this case, it is obvious that the LED lamp, the vibration function, and the like of the smart glasses 101 are also disabled. In another example, for example, if the unworn mode is obtained as the current mode in step S414, the smart glasses 101 execute the call in step S416 in a state where the sound output from the earphones (or by bone conduction) is disabled and the sound output from the speaker is enabled. In this case, it is obvious that the LED lamp, the vibration function, and the like of the smart glasses 101 are also disabled.

An equivalent table for notification means during notification from each application in operation other than a call is also illustrated. FIG. 11 illustrates means during a call, and assumes only an audio notification. Accordingly, when it is assumed that a call is executed, it is assumed that dotted cells in FIG. 11 are basically OFF (basically not used as call settings). However, for example, a setting for turning on the LED lamp to notify other persons surrounding the user of the calling state may be made as a default setting. In the call operation according to the present exemplary embodiment, differences in call settings between applications, such as "call application that uses a telephone line" and "call application such as a messenger application that uses a network line", are not assumed. Accordingly, these call applications are used in common and the call is executed based on call settings illustrated in FIG. 11. However, call settings for each mode may be made as default settings for each call application.

If the call start is not detected in step S413, the processing proceeds to step S417 to check whether a notification from an application installed on the smart glasses 101 is detected. If a notification from the application is detected, the current mode is obtained in step S418 like in step S414, and, in step S419, notification settings based on the obtained mode are obtained. The notification is then executed in step S420 based on the obtained notification settings.

The information referenced to obtain the settings in step S419 is table information illustrated in FIGS. 12A to 12C.

Individual mode common notification settings illustrated in FIG. 12A are application common settings for each mode. Normal-mode individual application notification settings illustrated in FIG. 12B are an example of settings for each application during the normal mode. Unworn-mode individual application notification settings illustrated in FIG. 12C are an example of settings for each application during the unworn mode. During the normal mode in which the user is wearing the smart glasses, the LED lamp function, the vibration function, and the like are disabled. This setting is made to intend to prevent the smart glasses from being misaligned due to the notification, or to prevent lighting of the LED lamp from causing a blurred vision.

If a setting for giving priority to application settings is ON on the setting application on the smart glasses 101, the notification settings tables for each application illustrated in FIGS. 12B and 12C are referenced. If priority is not given to the application settings, a common notification settings table illustrated in FIG. 12A is referenced.

In the cells illustrated in FIGS. 12B and 12C, grayed cells indicate settings different from the common settings illustrated in FIG. 12A. As for notification settings that are not assumed to be used basically during the notification, settings indicated by dotted cells on the tables are OFF, but instead may be ON if the settings are used. For example, the message display in FIG. 12C is OFF. This is because it is assumed that the message display on the lens 105 of the smart glasses 101 is viewed by the user wearing the smart glasses 101. Therefore, the message display is OFF during the unworn mode. However, for example, the message display may be ON, if the smart glasses 101 include a function for inverting a message projected on the lens 105 from that in the worn mode as the message display on the lens 105, to thereby enable the user to view the lens 105 from the outside during the unworn mode.

Next, display examples using a setting application user interface (UI) on the display 202 of the smart glasses 101 will be described with reference to FIGS. 5A to 7C. Settings on the setting application include a setting screen when the user makes ON/OFF settings illustrated in FIG. 11 and FIGS. 12A to 12C. This screen is provided to a web browser or the like of another terminal via a network, thereby enabling the user to perform a setting operation.

FIGS. 5A to 5D illustrate top screen examples when the setting application is activated and screen examples when items on the top screen display are selected.

In a top screen example illustrated in FIG. 5A, setting items for setting a mode selection 501, a call/notification 502, and a screen 503 on a setting screen 500 are displayed as a list. On the setting screen 500, various setting items for the smart glasses 101, such as Wi-Fi®, Bluetooth®, and battery, are also displayed as a list for each large category.

Figure 5C:
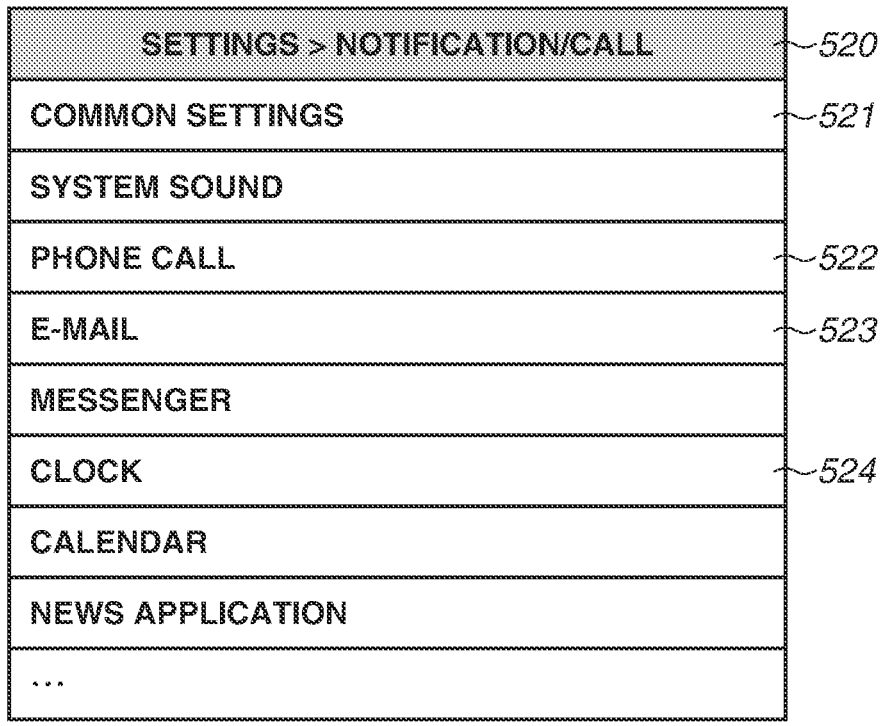
FIG. 5C illustrates an example of display control for a setting screen on the glasses-type information device according to the present invention.
Figure 5D:
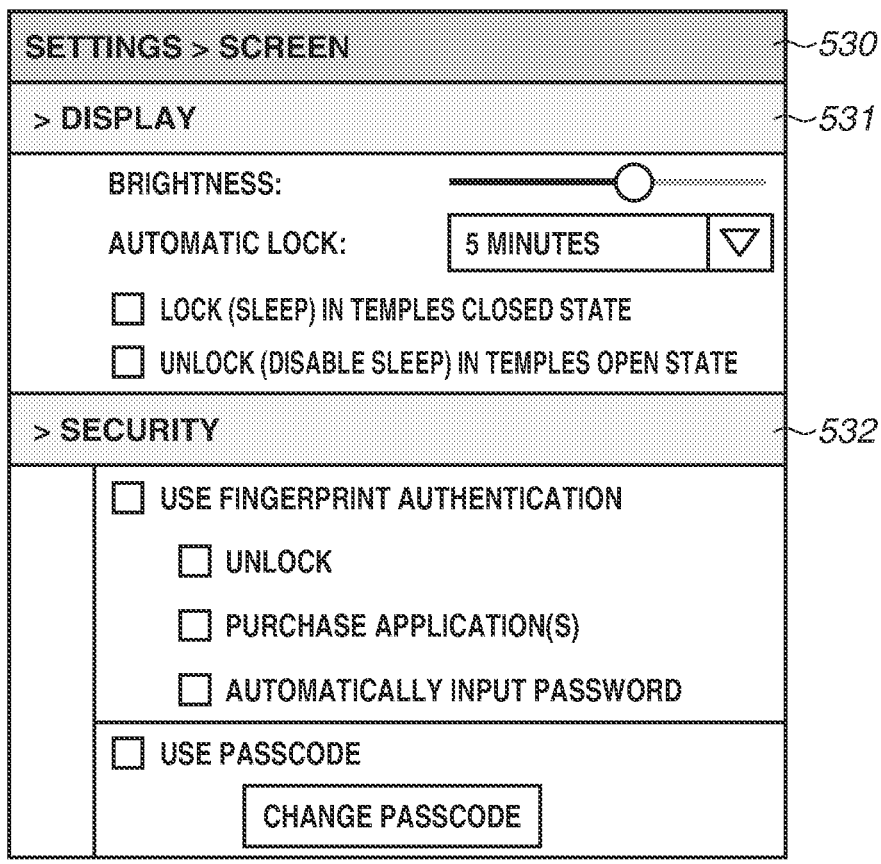
FIG. 5D illustrates an example of display control for a setting screen on the glasses-type information device according to the present invention.

FIGS. 5B to 5D each illustrate setting screens for each item to be transitioned when the items 501, 502, and 503 illustrated in FIG. 5A are selected, respectively.

FIG. 5B illustrates a mode selection settings screen 510. The user can switch modes by selecting a mode using a pull-down menu indicated in an item 511 on the mode selection settings screen. The mode selection settings screen also includes a hardware switch enabling checkbox 512 for enabling mode switching in association with a hardware switch. After the hardware switches are enabled, modes to be associated with the switches (including sensors) mounted on the smart glasses 101 can be selected using a pull-down menu in an item 513. Examples of such hardware switches are assumed to include the ON/OFF switch 227 and the temple opening/closing switch 228 illustrated in FIG. 2, and other sensor states ON/OFF. Depending on the state of a plurality of hardware switches, the associated modes may compete with each other. Accordingly, a prioritization setting for giving priority to any one of the modes associated with any one of the switches can also be made in the item 513, if the modes compete with each other. In this case, a checkbox with no priority number in the priority in the item 513 indicates that the hardware switch is disabled. The hardware switch corresponding to the checkbox is enabled by pressing the checkbox, thereby making it possible to set the priority. Further, if the hardware switches are enabled, priority is given to the mode based on the switch state set in the item 513 over the mode selected by the user in the item 511.

FIG. 5C illustrates a call/notification settings screen 520. The call/notification settings screen 520 displays as a list common settings 521 for making application common settings and settings for each application other than the common settings. The settings for each application include not only applications, such as a phone call 522, an e-mail 523, and a clock 524, but also settings for applications installed on the smart glasses 101, such as system sound, messenger, calendar, and news application.

FIG. 5D illustrates a screen settings screen 530. The screen settings screen 530 displays settings for screen display on the display 202 of the smart glasses 101. For example, in display settings 531, the brightness of the screen can be adjusted using a slide bar, and a time to start locking the screen during automatic screen locking in a case where a screen operation is not performed by the user for a predetermined period of time can be selected using a pull-down menu. The display settings 531 also include checkboxes for enabling "setting for locking the screen when the frame 104 is closed" and "setting for unlocking the screen when the frame 104 is opened". Unlocking the screen indicates display of an authentication screen to request for user authentication to unlock the screen. On the screen settings screen 530, a security setting 532 can also be made. This setting can be made by turning ON or OFF the checkbox indicating whether to enable the above-described screen locking using fingerprint authentication or a password.

Figure 6:
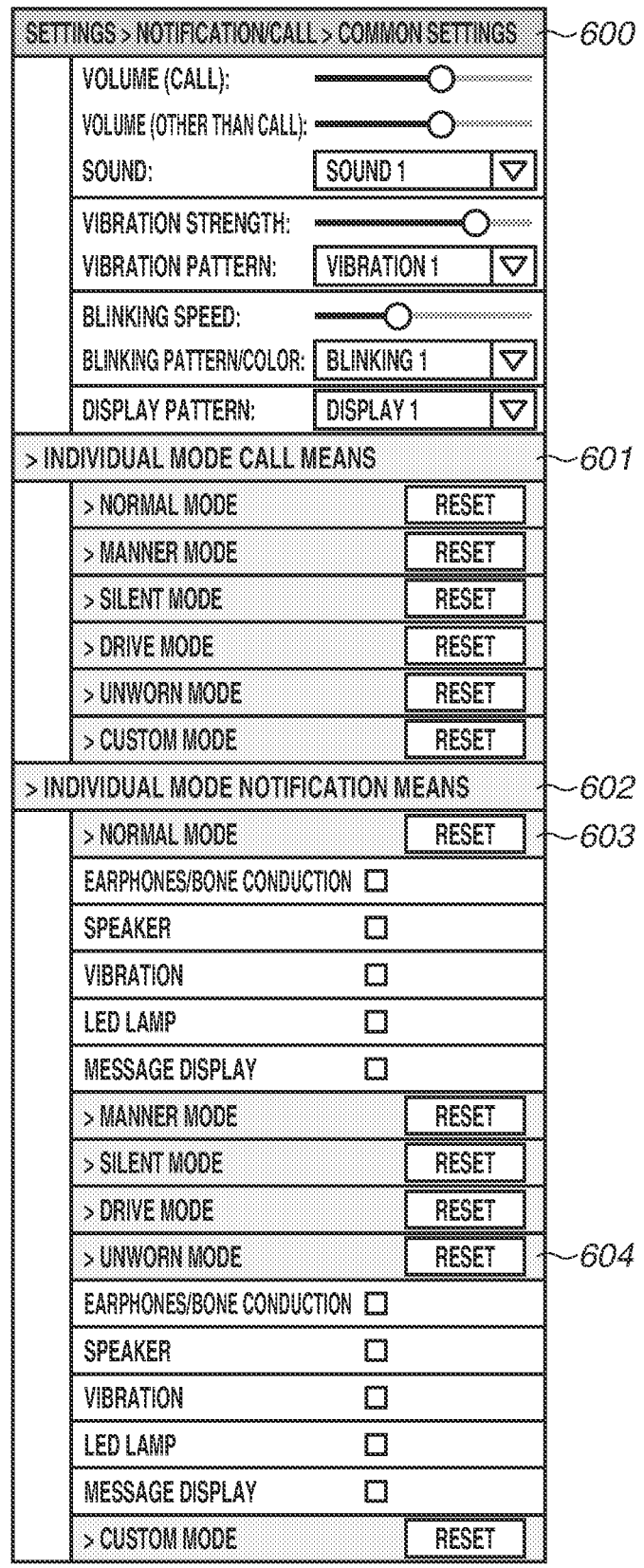
FIG. 6 illustrates a display control example of common settings for call and notification of the glasses-type information device according to the present invention.

FIG. 6 illustrates an example of a setting screen for call/notification common settings to be used when the common settings 521 are selected in FIG. 5C. A call/notification common settings screen 600 includes a slide bar for sound volume adjustment for a call, a slide bar for sound volume adjustment for operation other than a call, a selection pulldown menu for selecting sound, a slide bar for vibration strength adjustment, a slide bar for blinking speed adjustment, selection pulldown menus for selecting a vibration pattern, a blinking pattern and color, and a selection pulldown menu for selecting a message display pattern. The common settings screen 600 also includes items for individual mode call means 601 and individual mode notification means 602. When these items 601 and 602 are selected, lower-level mode items, such as the normal mode, the manner mode, the silent mode, the drive mode, the unworn mode, and the custom mode, are displayed as a list. For example, if items, such as a normal mode 603 and an unworn mode 604, which are lower-level items of the individual mode notification means 602, are selected, notification means, such as "earphones/bone conduction", "speaker", "vibration", "LED lamp", and "message display" are displayed in each mode. When a checkbox corresponding to any of these notification means is checked, the notification is issued by the notification means checked in the mode. The settings made on the individual mode call means 601 and the individual mode notification means 602 on the common settings screen 600 are reflected in the ON/OFF settings illustrated in FIG. 11 and the ON/OFF settings illustrated in FIG. 12A, respectively.

Figure 7A:
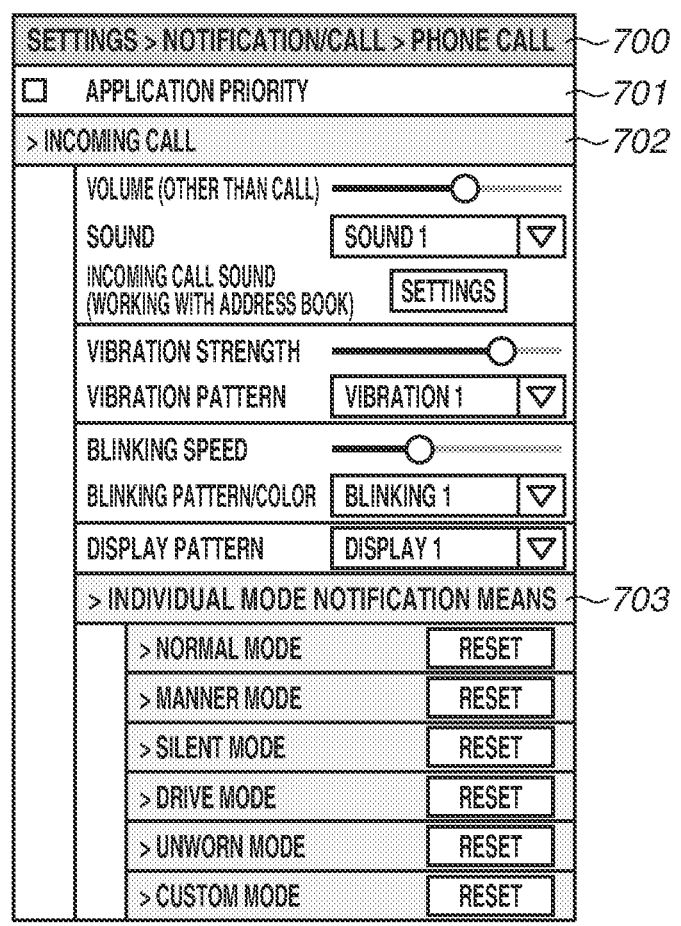
FIG. 7A illustrates a display control example of settings for each application regarding notification for the glasses-type information device according to the present invention.
Figure 7B:
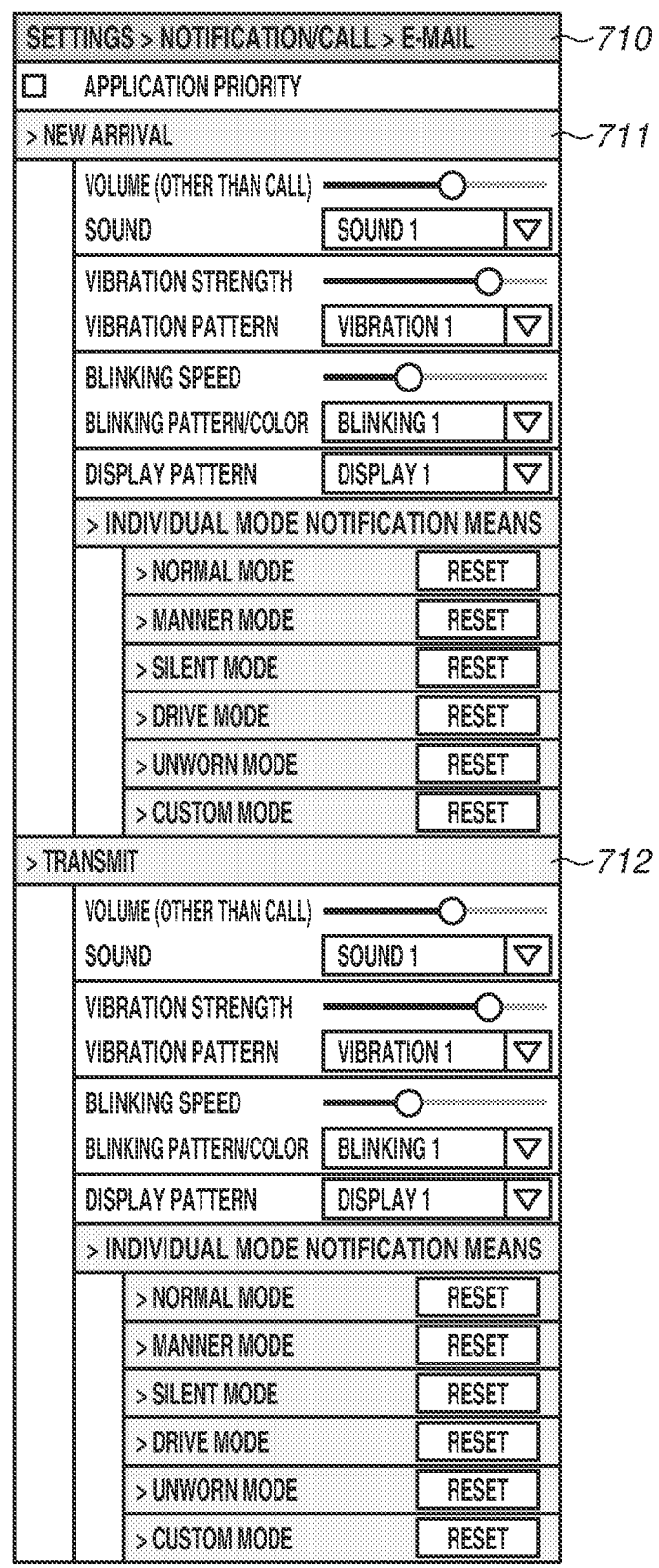
FIG. 7B illustrates a display control example of settings for each application regarding notification for the glasses-type information device according to the present invention.
Figure 7C:
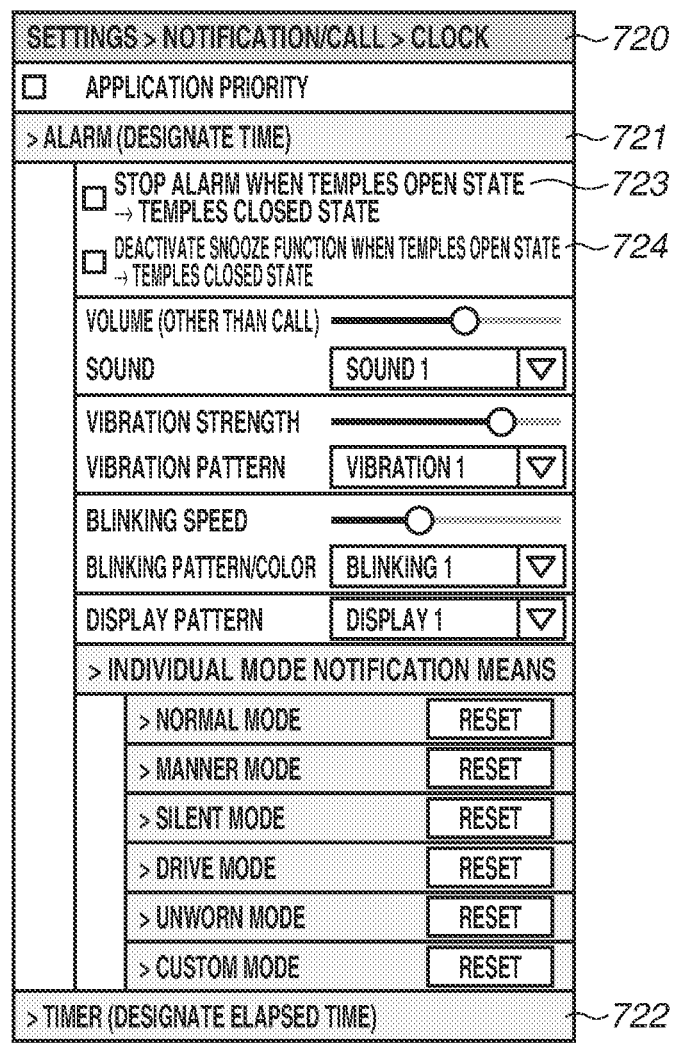
FIG. 7C illustrates a display control example of settings for each application regarding notification for the glasses-type information device according to the present invention.

FIGS. 7A to 7C respectively illustrate setting screen examples for each application regarding a notification to be used when the items 522, 523, and 524 are selected in FIG. 5C.

FIG. 7A illustrates an example of a setting screen for a notification from a telephone application. A telephone application notification settings screen 700 includes a checkbox 701 for application priority. When this application is used, checking this checkbox gives priority to the settings made on the telephone application notification settings screen 700 illustrated in FIG. 7A over the settings made on the common settings screen 600 illustrated in FIG. 6 described above. On the telephone application notification settings screen 700, settings similar to notification settings on the common settings screen 600 can be made as for the notification settings regarding an incoming call 702 as a notification about the telephone application. Individual mode notification means 703 included in the incoming call 702 on the telephone application notification settings screen 700 is used to set notification means during each mode on the individual telephone application. This setting is reflected in, for example, the ON/OFF setting in the row of application ID "NOTIFY-APP-001" illustrated in FIGS. 12B and 12C.

FIG. 7B illustrates an example of a setting screen for a notification from an e-mail application. Like in FIG. 7A, an e-mail application notification settings screen 710 also includes a checkbox for application priority, and settings similar to the notification settings on the common settings screen 600 can be made. Notification on the e-mail application notification settings screen 710 includes setting items, such as a new e-mail reception notification 711 and an e-mail transmission notification 712. The settings for the items 711 and 712 are respectively reflected in the ON/OFF settings in the rows of application ID "NOTIFY-APP-002" and application ID "NOTIFY-APP-003" illustrated in FIG. 12B and FIG. 12C.

FIG. 7C illustrates an example of a setting screen for a notification from a clock application. Like in FIG. 7A, a clock application notification settings screen 720 also includes a checkbox for application priority, and settings similar to the notification settings on the common settings screen 600 can be made. Notification on the clock application notification settings screen 720 includes setting items, such as an alarm notification 721 and a timer notification 722. The settings for the items 721 and 722 are respectively reflected in the ON/OFF settings in the rows of application ID "NOTIFY-APP-007" and application ID "NOTIFY-APP-008" illustrated in FIG. 12B and FIG. 12C. The clock application notification settings screen 720 also includes a checkbox 723 for enabling a function to stop an alarm notification when the frame 104 is opened during an alarm notification continuation state in which the frame 104 is in the closed state. The clock application notification settings screen 720 also includes a checkbox 724 for enabling a function to deactivate the snooze function when the frame 104 is opened during a snooze function activation state in which the frame 104 is in the closed state.

According to the first exemplary embodiment described above, the functions to be used for notification, call, and the like can be selectively used based on opening/closing of the frame 104 of the smart glasses 101 and each mode.

Second Exemplary Embodiment

Another exemplary embodiment will now be described with reference to FIG. 8. Processing illustrated in FIG. 8 is an extension of notification processing based on a human detection function in the closed state of the frame 104 of the smart glasses 101.

Figure 8:
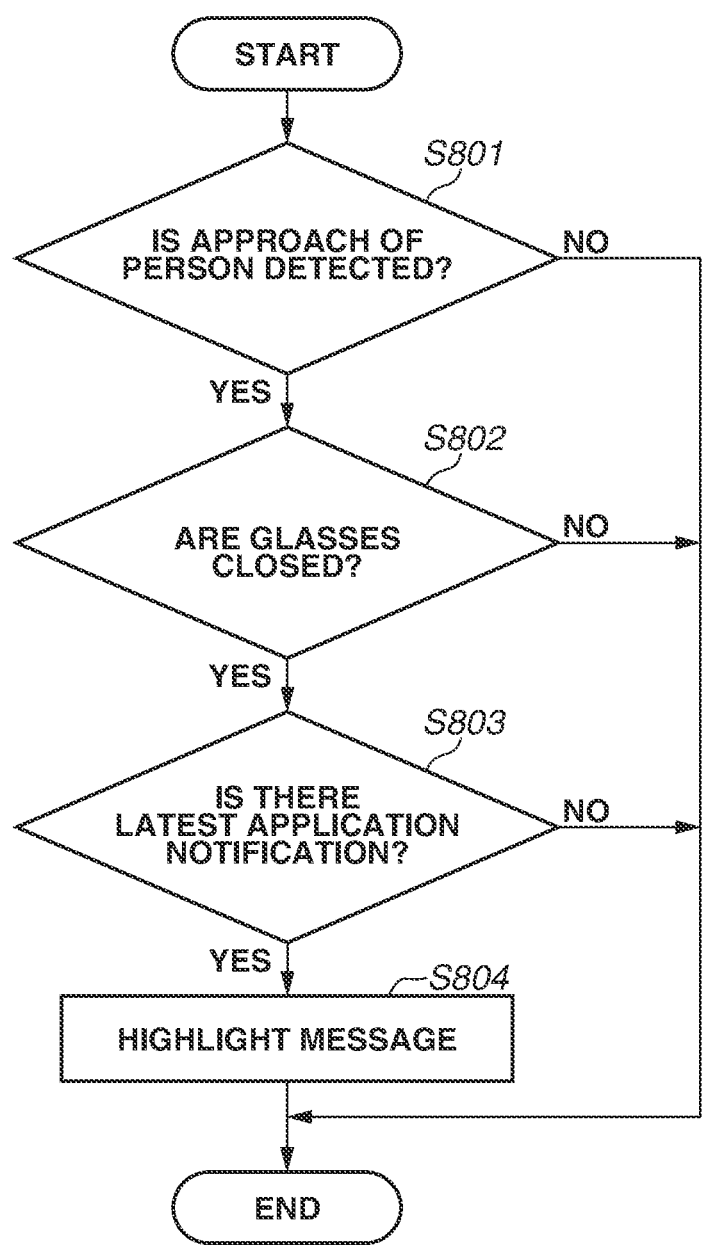
FIG. 8 is a flowchart illustrating notification processing for the glasses-type information device according to a second exemplary embodiment.

FIG. 8 is a flowchart illustrating notification processing for a glasses-type information device according to a second exemplary embodiment.

In step S801, the human presence sensor 220 mounted on the smart glasses 101 detects whether a person is present within a specific range of the smart glasses 101. If it is detected that a person approaches within a specific range of the smart glasses 101, the processing proceeds to step S802 to detect whether the smart glasses 101 are in the temples-closed state ("glasses closed").

In step S802, if the smart glasses 101 are closed, the processing proceeds to step S803 to check whether there is the latest application notification that has not been read by the user.

In step S803, if there is the latest application notification that has not been read by the user, the processing proceeds to step S804 to highlight a message on the lens 105 of the smart glasses 101. Highlighting a message indicates display of a message by inverting the message from that when the laser 211 projects various contents on the display 202 and the user is wearing the smart glasses 101.

According to the second exemplary embodiment described above, when the user has approached the smart glasses when the frame 104 of the smart glasses 101 is closed, the user can check new application notification message without the need for opening the frame 104.

Third Exemplary Embodiment

Figure 9:
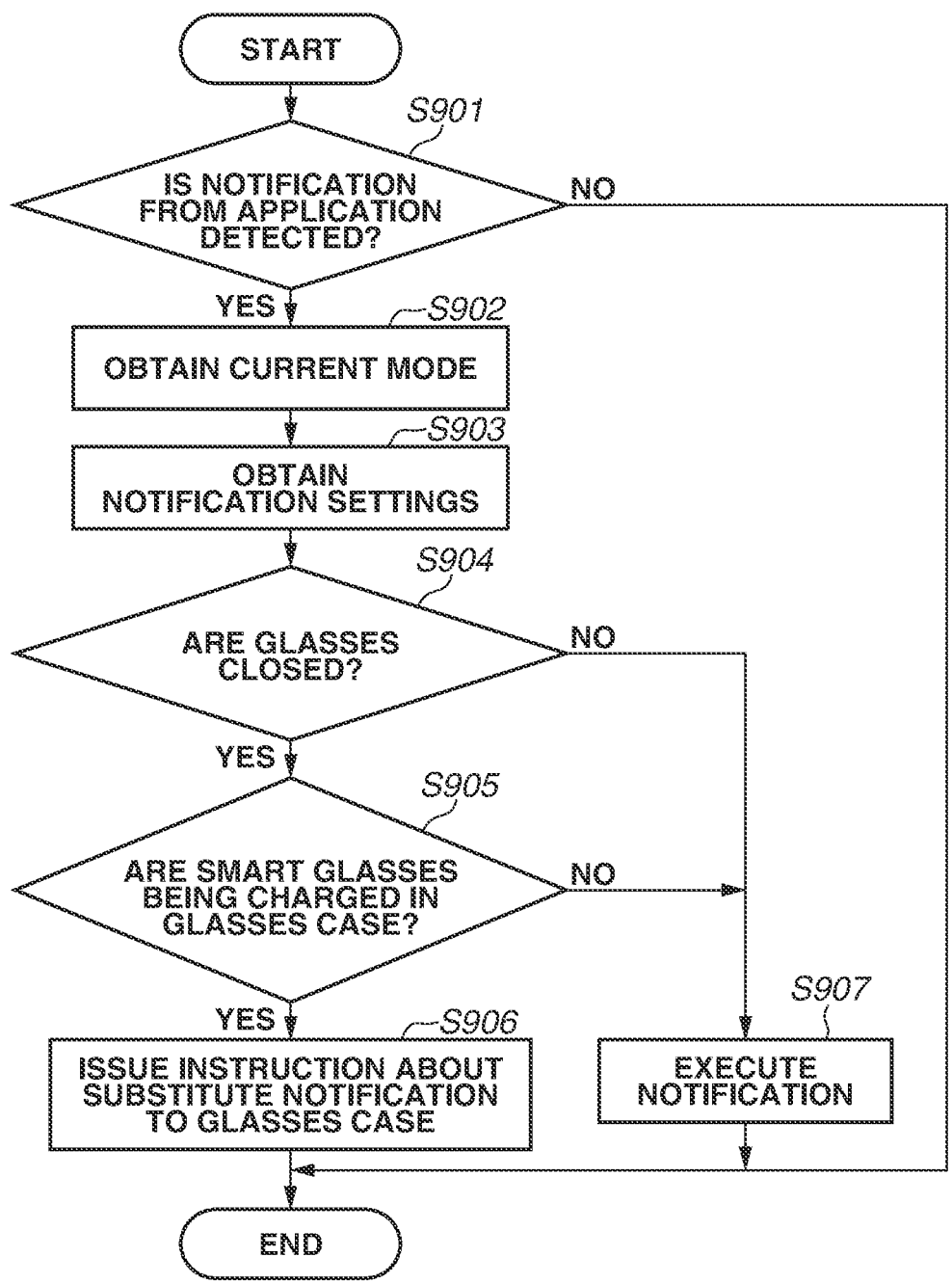
FIG. 9 is a flowchart illustrating notification processing for the glasses-type information device according to a third exemplary embodiment.

Still another exemplary embodiment will now be described with reference to FIG. 9. Processing illustrated in FIG. 9 is an extension of notification processing in a state where the smart glasses 101 are closed and stored in the glasses case (not illustrated) while the smart glasses are being charged. In a case where the smart glasses are stored in the glasses case and are being charged, there is a concern that the user cannot notice the notification described in the above-described other exemplary embodiment.

FIG. 9 is a flowchart illustrating notification processing for a glasses-type information device according to a third exemplary embodiment.

In step S901, the smart glasses 101 detects the presence or absence of an application notification, like in step S417 according to the first exemplary embodiment. Subsequent steps S902 and S903 are processing similar to steps S418 to S419 according to the first exemplary embodiment. After notification settings are obtained in step S903, it is checked, in step S904, whether the smart glasses 101 are closed. If the smart glasses 101 are in the temples-closed state ("glasses closed") in step S904, it is further checked, in step S905, whether the smart glasses 101 are stored in the glasses case capable of charging the smart glasses.

In this case, the smart glasses 101 and the glasses case are configured to communicate with each other via the short-range communication I/F 213. The glasses case further includes substitute notification means (not illustrated) for substituting the display 202, the speaker 224, the vibrator 225, and the LED lamp 226 of the smart glasses 101. The substitute notification means included in the glasses case includes a display for displaying a notification content and the like and a speaker for outputting sound.

If, in step S905, the smart glasses 101 are stored in the glasses case and are being charged, the processing proceeds to step S906. In step S906, the smart glasses 101 issues an instruction to control the notification using the substitute notification means to the glasses case. The instruction may include at least a part of the notification content in addition to information about the application that has issued the notification. This instruction implements a substitute notification using the substitute notification means included in the glasses case. If, in step S905, the smart glasses 101 are not stored in the glasses case, the notification from the application is transmitted to the user using the notification means mounted on the smart glasses 101, like in step S420 according to the first exemplary embodiment.

According to the third exemplary embodiment described above, the glasses case can issue a notification in substitution for the smart glasses even in a state where the smart glasses 101 are stored in the glasses case and are being charged.

Fourth Exemplary Embodiment

As still another exemplary embodiment, skin sensor detection ON/OFF may be used as a hardware switch to be associated with the unworn mode, separately from the temple opening/closing switch.

Figure 10:
FIG. 10 illustrates a display control example of a glasses-type information device according to a fourth exemplary embodiment.

FIG. 10 illustrates an example of a mode selection settings screen on which skin sensor detection ON/OFF can be associated with the unworn mode.

A mode selection screen 1000 illustrated in FIG. 10 is equivalent to the mode selection settings screen 510 described in the first exemplary embodiment. Screen items 1001 to 1003 on the mode selection screen 1000 are also similar to the items 511 and 513 on the mode selection settings screen 510.

A skin sensor OFF 1004 on a mode selection screen 1004 is a hardware switch item that is a characteristic item of a fourth exemplary embodiment, and the switch item is assumed to be associated with the unworn mode. The skin sensor described herein corresponds to the temple skin sensor 219. The temple skin sensor 219 installed on the inside of the temple portion of the frame 104 on the smart glasses 101 detects whether the human skin is in contact with the inside of the temple portion. If the human skin is not in contact with the inside of the temple portion, the temple skin sensor 219 is in an undetected state in the skin detection. This undetected state corresponds to the switch state of the skin sensor OFF 1004.

According to the fourth exemplary embodiment described above, the state where the user is wearing the smart glasses 101 can be detected by another detection means different from opening/closing of the smart glasses 101, the notification means for each application can be switched based on the detected state.

Some users may take off the smart glasses 101 and leave the smart glasses 101 in a state where the frame 104 of the smart glasses 101 is open. Examples of this situation include a situation where the user is washing his or her face, and a situation where the user is cleaning the lenses of the smart glasses with cloth. In such use cases, it is not sufficient only to associate the temple opening/closing switch in the frame 104 of the smart glasses 101 with the unworn mode. Accordingly, in such use cases, it is effective to associate the unworn mode with skin sensor detection ON/OFF described in the fourth exemplary embodiment, and the use cases can be expanded compared to the first exemplary embodiment.

Other Exemplary Embodiments

The present invention also includes an apparatus or system configured by combining the above-described exemplary embodiments as appropriate, and a method for the apparatus or system.

Herein, the present invention provides an apparatus or system that executes one or more pieces of software (programs) to implement the functions according to the above-described exemplary embodiments. A method for implementing the above-described exemplary embodiments to be executed by the apparatus or system is also one aspect of the present invention. A program therefor is supplied to the system or apparatus via a network or various storage media, and one or more computers (CPUs, micro processing units (MPUs), or the like) in the system or apparatus read out the program into one or more memories and execute the program. In other words, as one aspect of the present invention, the program itself and various computer-readable storage media storing the program are also included. The present invention can also be implemented by a circuit (e.g., an application-specific integrated circuit (ASIC)) for implementing the functions according to the above-described exemplary embodiments.

The present invention is not limited to the above-described exemplary embodiments, and can be modified or altered in various ways without departing from the spirit and scope of the present invention. Accordingly, the following claims are attached to publicize the scope of the present invention.

According to the present invention, it is possible to perform notification control assuming at least one of a usage situation, a user operation, and a use scene of a glasses-type information device.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A glasses-type information device having a notification function including at least one of a vibration function and a function of turning on a lamp, comprising:
at least one speaker, wherein the at least one speaker is configured to provide a first speaker function configured to transmit sound to a user wearing the glasses-type information device and a second speaker function configured to transmit sound to a surrounding area of the glasses-type information device;
at least one memory storing instructions; and
at least one processor executing the instructions causing the glasses-type information device to:
enable, in a case where temples of the glasses-type information device are folded and the glasses-type information device is not worn by the user, an output using at least one of the second speaker function and the notification function for an output related to an application installed on the glasses-type information device, while disabling the first speaker function; and
enable, in a case where the glasses-type information device is worn by the user, an output using the first speaker function for an output related to the application, while disabling the second speaker function and the notification function.

2. The glasses-type information device according to claim 1, wherein the instructions further cause the glasses-type information device to set, in a case where the temples of the glasses-type information device are folded and the glasses-type information device is not worn by the user, a function to be used for the application from among the second speaker function and the notification function.

3. The glasses-type information device according to claim 1, wherein the application is an application configured to provide a function of displaying a message to the user via the glasses-type information device.

4. The glasses-type information device according to claim 3, wherein the application includes at least one of an application for providing a telephone function, an application for transmitting/receiving an email, an application for providing a calendar function, and an application for providing news.

5. A glasses-type information device having a notification function including at least one of a vibration function and a function of turning on a lamp, comprising:
at least one speaker, wherein the at least one speaker is configured to provide a first speaker function configured to transmit sound to a user wearing the glasses-type information device and a second speaker function configured to transmit sound to a surrounding area of the glasses-type information device;
at least one memory storing instructions; and
at least one processor executing the instructions causing the glasses-type information device to selectively set a function to be used for each of a plurality of applications installed on the glasses-type information device from among the first speaker function, the second speaker function, and the notification function.

6. A method for a glasses-type information device, wherein the glasses-type information device includes a notification function including at least any of a first speaker function configured to transmit sound to a user wearing the glasses-type information device, a second speaker function configured to transmit sound to a surrounding area of the glasses-type information device, a vibration function, and a function of turning on a lamp, the method comprising:
enabling, in a case where temples of the glasses-type information device are folded and the glasses-type information device is not worn by the user, an output using at least one of the second speaker function and the notification function for an output related to an application installed on the glasses-type information device, while disabling the first speaker function; and
enabling, in a case where the glasses-type information device is worn by the user, an output using the first speaker function for an output related to the application, while disabling the second speaker function and the notification function.

7. A method for a glasses-type information device, wherein the glasses-type information device includes a notification function including any of a first speaker function configured to transmit sound to a user wearing the glasses-type information device, a second speaker function configured to transmit sound to a surrounding area of the glasses-type information device, a vibration function, and a function of turning on a lamp, the method comprising:
selectively setting a function to be used for each of a plurality of applications installed in the glasses-type information device from among the first speaker function, the second speaker function, and the notification function.

8. A non-transitory computer readable storage medium on which is stored a computer program for making a computer execute a method for a glasses-type information device, wherein the glasses-type information device includes a notification function including at least any of a first speaker function configured to transmit sound to a user wearing the glasses-type information device, a second speaker function configured to transmit sound to a surrounding area of the glasses-type information device, a vibration function, and a function of turning on a lamp, the method comprising:
enabling, in a case where temples of the glasses-type information device are folded and the glasses-type information device is not worn by the user, an output using at least one of the second speaker function and the notification function for an output related to an application installed on the glasses-type information device, while disabling the first speaker function; and
enabling, in a case where the glasses-type information device is worn by the user, an output using the first speaker function for an output related to the application, while disabling the second speaker function and the notification function.

9. A non-transitory computer readable storage medium on which is stored a computer program for making a computer execute a method for a glasses-type information device, wherein the glasses-type information includes a notification function including at least any of a first speaker function configured to transmit sound to a user wearing the glasses-type information device, a second speaker function configured to transmit sound to a surrounding area of the glasses-type information device, a vibration function, and a function of turning on a lamp, the method comprising:
selectively setting a function to be used for each of a plurality of applications installed on the glasses-type information device from among the first speaker function, the second speaker function, and the notification function.

* * * * *